United States Patent [19]

Shaughnessy

[11] 4,032,848

[45] June 28, 1977

[54] RECEIVER FOR A CODED ELECTRONIC SECURITY SYSTEM

[75] Inventor: Frank J. Shaughnessy, Hartford, Conn.

[73] Assignee: The Stanley Works, New Britain, Conn.

[22] Filed: July 31, 1975

[21] Appl. No.: 600,901

[52] U.S. Cl. .............................. 325/325; 325/349; 340/171 PF; 340/224; 340/412

[51] Int. Cl.[2] .......................................... H04B 1/16

[58] Field of Search .................................... 325/325

[56] References Cited

UNITED STATES PATENTS

| | | | |
|---|---|---|---|
| 3,694,757 | 9/1972 | Hanna | 325/325 |
| 3,769,593 | 10/1973 | Williams | 325/325 |
| 3,855,575 | 12/1974 | Leuschner | 325/325 |
| 3,898,574 | 8/1975 | Allen | 325/325 |

*Primary Examiner*—Thomas B. Habecker
*Attorney, Agent, or Firm*—Brumbaugh, Graves, Donohue & Raymond

[57] ABSTRACT

The present invention pertains to a receiver for a coded electronic security system which includes a plurality of independent transmitting devices each of which generates a pulse coded RF signal when activated. The receiver demodulates the pulse coded signal and separates from the demodulated signal a high frequency square wave unique to each transmitter in the system and a low frequency square wave common to each of the transmitters in the system. The receiver determines the frequency of the high frequency square wave, verifies that the low frequency square wave is the one appropriate for the system, and then indicates which of the transmitters in the system has been activated.

14 Claims, 10 Drawing Figures

FIG. 6
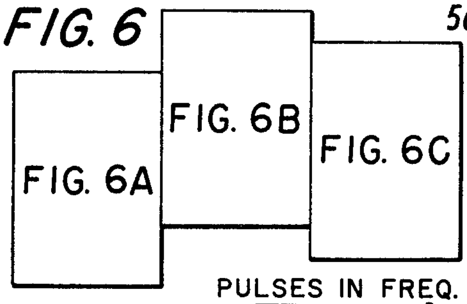
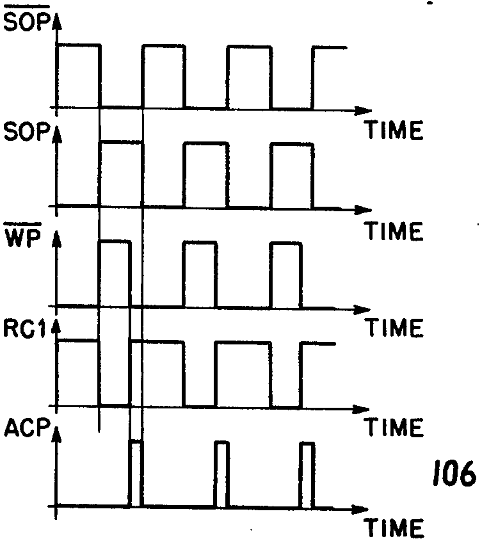
FIG. 7
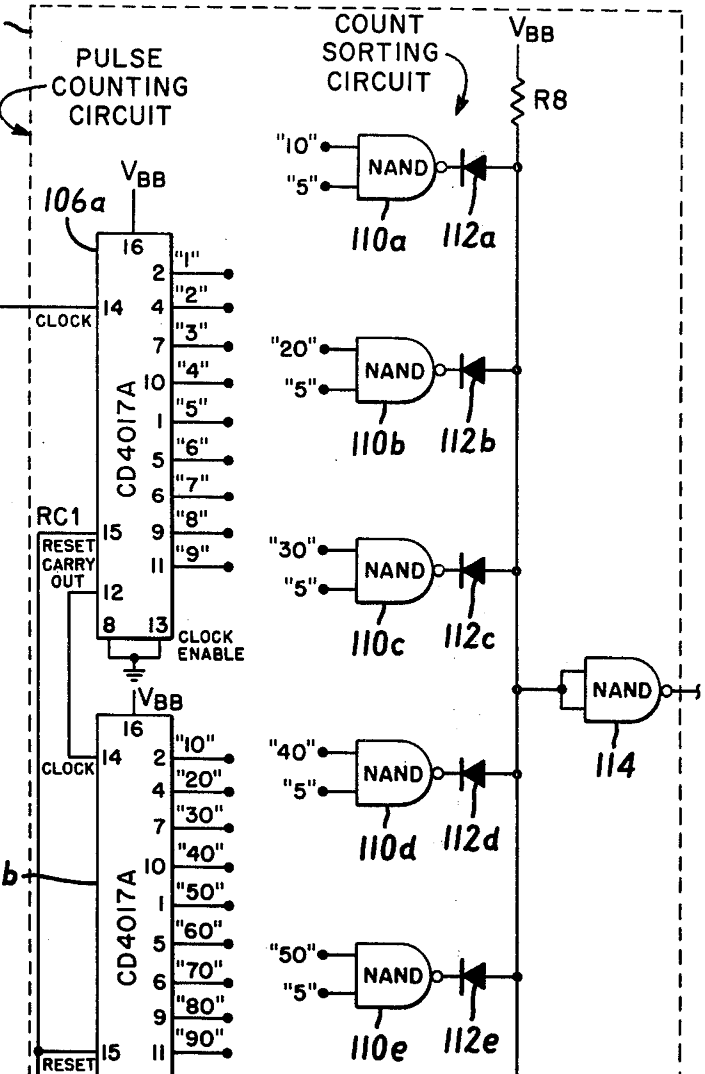
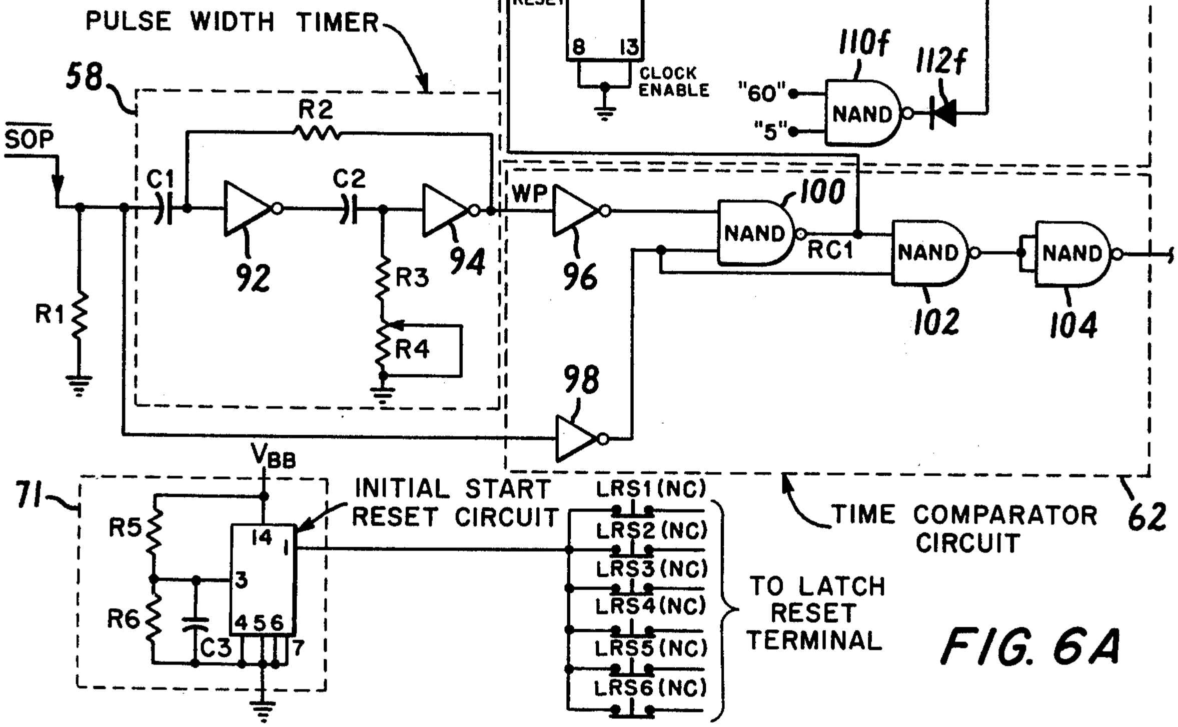
FIG. 6A

RECEIVER FOR A CODED ELECTRONIC SECURITY SYSTEM

CROSS-REFERENCES TO RELATED APPLICATIONS

The present application is related to Ser. No. 600,935 for CODED ELECTRONIC SECURITY SYSTEM filed concurrently herewith and Ser. No. 600,891, now U.S. Pat. No. 4,027,276 issued May 31, 1977 for TRANSMITTER FOR A CODED ELECTRONIC SECURITY SYSTEM filed concurrently herewith, which are both assigned to the assignee of the present invention by Frank J. Shaughnessy.

BACKGROUND OF THE INVENTION

The present invention relates to a receiver for a coded electronic security system, and more particularly, to a receiver capable of monitoring a plurality of different transmitters and indicating which of the transmitters has been activated by an alarm condition.

Security systems for protecting homes and businesses are becoming increasingly popular due to an increase in vandalism and theft. The most commonly used protective systems require wiring of doors and windows in such a manner that the unauthorized opening of a protected door or window activates an alarm. Conventional systems which require extensive wiring and specially designed switching devices are susceptible to tampering and failure, and they are expensive to install.

Heretofore, attempts at using wireless intrusion alarm systems have met with limited success because such systems have been simply designed merely to indicate the presence of an actuating signal at the remote receiver. Any discrimination relating to rejection of other signals also present was provided merely to avoid false alarms. An indication of an alarm generally did not provide an indication of which particular transmitter in a system having a plurality of transmitters had activated the alarm, unless there were a like number of transmitters and receivers each operating on a different frequency within the system.

SUMMARY OF THE INVENTION

The present invention provides a receiver for a coded electronic security system which is capable of indicating which of a plurality of transmitters used in the system has transmitted an alarm signal.

The invention further provides a receiver capable of verifying that a radio frequency signal contains a low frequency signal common to each of the transmitters in the system.

In particular, the receiver comprises means for receiving and demodulating a pulse coded RF signal to obtain a high frequency square wave and a low frequency square wave. The frequency of the high frequency square wave is determined and associated with a particular one of the transmitters in the system, and an alarm is sounded. Simultaneously, a light associated with the particular activating transmitter will flash.

Various verification circuits within the receiver determine, prior to activation of the alarm, that the signal received comes from one of the transmitters in the system. Thus, the receiver will reject a signal unless the high frequency square wave exceeds a predetermined minimum frequency.

Similarly, if the pulse width of the low frequency square wave is not larger than the width of a window pulse generated by a timer within the receiver, the receiver will reject the signal, and the receiver will also reject the signal if the frequency of the low frequency square wave is less than a frequency determined by a second timer within the receiver. In each of the situations in which the receiver rejects a signal, no alarm will be sounded.

In particular, a receiver for a coded electronic security system comprises means for receiving and demodulating a pulse coded RF signal to obtain a first digital signal. The receiver further comprises means for separating a second digital signal containing pulses having a pulse width greater than a first predetermined pulse width from the first digital signal. Pulse width means are provided for comparing the pulse width of the second digital system with a second predetermined pulse width. The number of pulses present in the first digital signal during the time span of the second predetermined pulse width are counted by a digital counter within the receiver. The receiver further comprises frequency means for indicating that the frequency of the second digital signal exceeds a predetermined frequency. Finally, the receiver comprises means for indicating that the first digital signal contains pulses having a repetition rate within a predetermined range if the pulse width of the second digital signal is greater than the second predetermined pulse width, the pulse width of the first digital signal is less than said first predetermined pulse width, and the frequency of the second digital signal is greater than the predetermined frequency. An external signal device may also be used, if desired.

BRIEF DESCRIPTION OF THE DRAWINGS

FIG. 7 is a series of voltage waveforms present in the receiver.

DETAILED DESCRIPTION OF AN EXEMPLARY EMBODIMENT

Transmitter Operation

Figure 1:
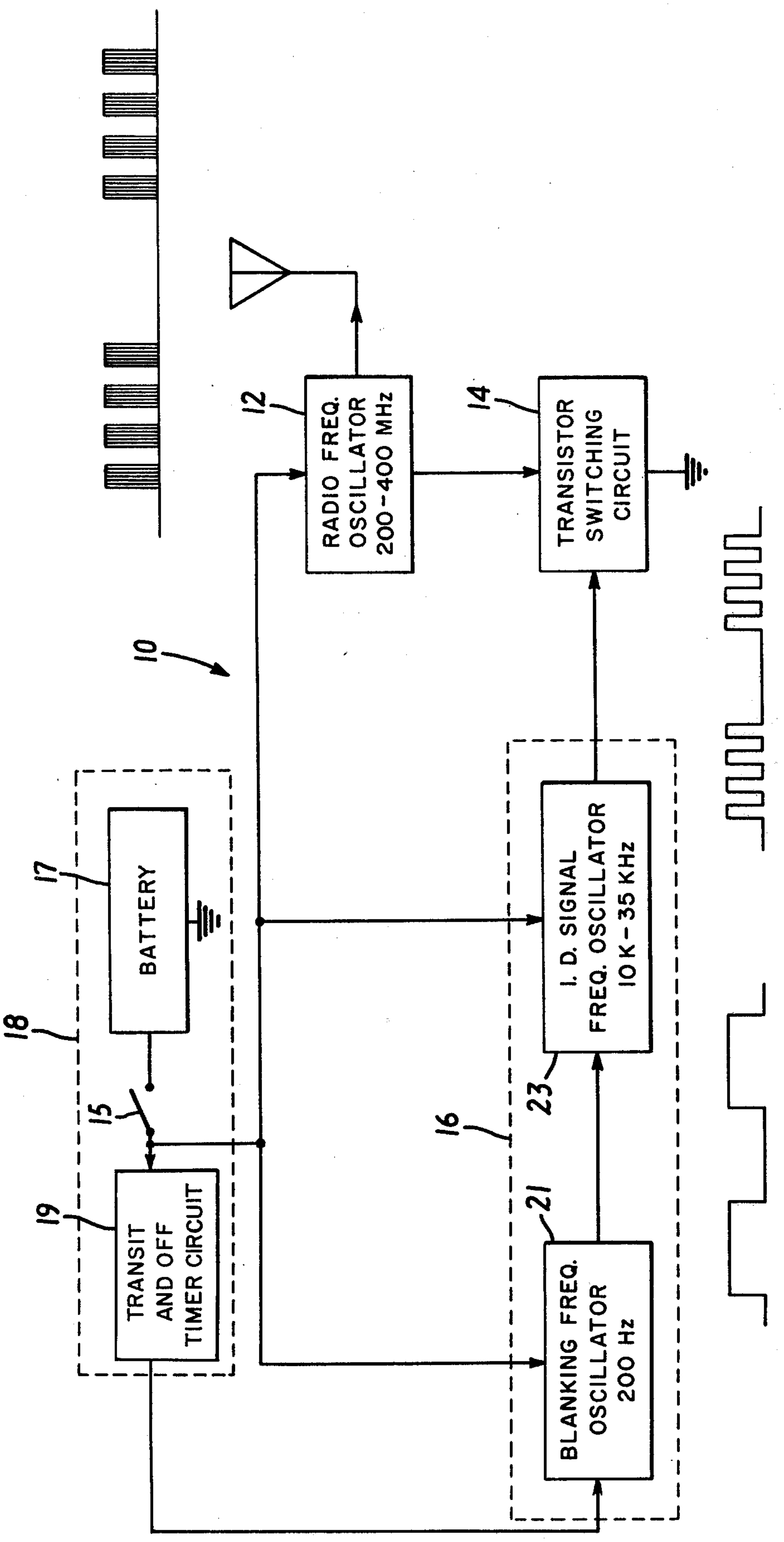
FIG. 1 is a block diagram of a transmitter.
Figure 2:
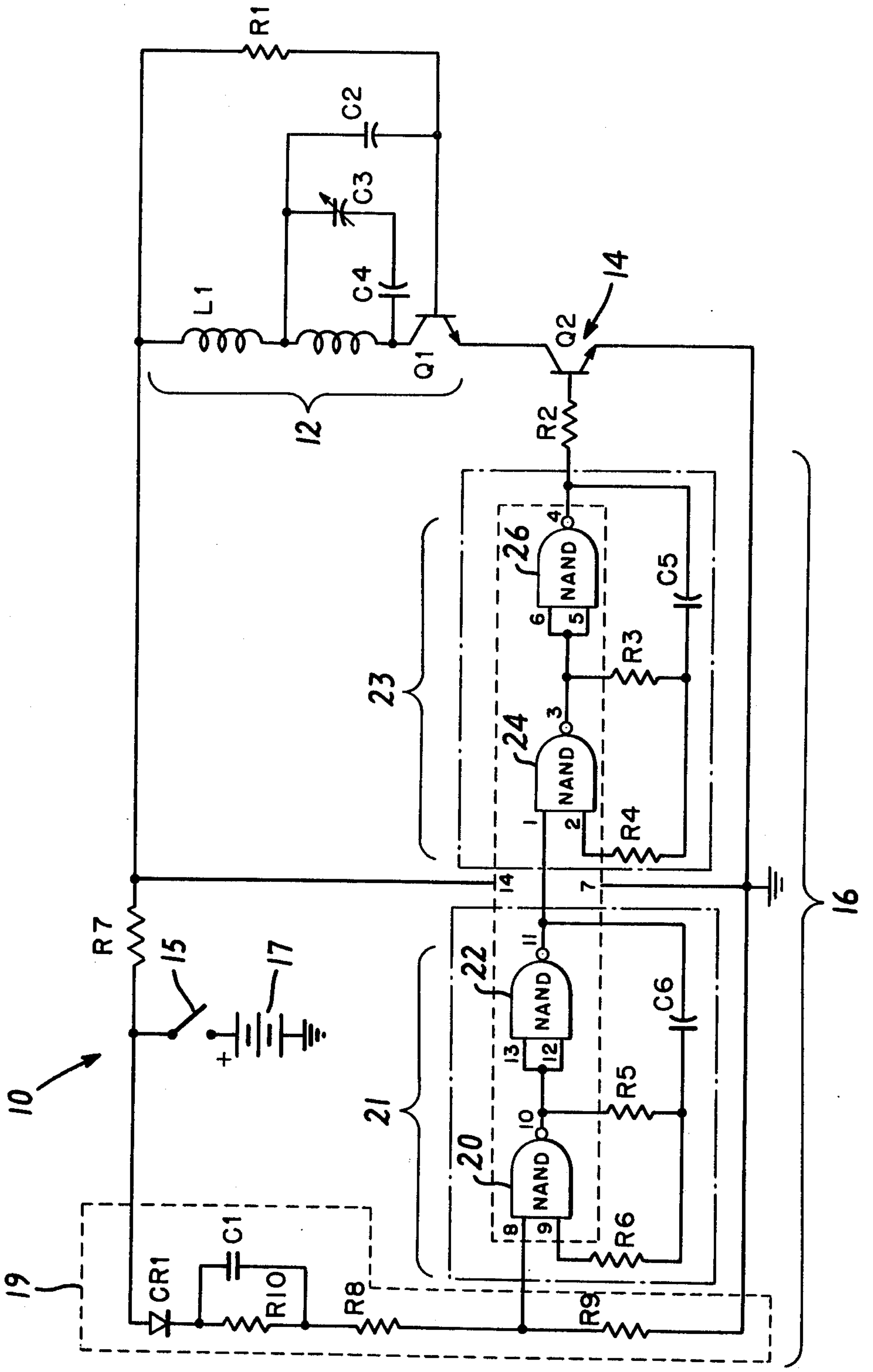
FIG. 2 is a schematic diagram of the transmitter of FIG. 1.

Referring generally to FIGS. 1 and 2, a transmitter 10 is comprised of an RF oscillator 12 preferably operating in the frequency range of from 200–400 MHz. The RF oscillator 12 is switched on and off by a transistorized switch 14 at a switching rate determined by a modulator 16 comprised of a low frequency astable multivibrator 21, also called the blanking oscillator, which preferably operates at about 200 Hz and a high frequency astable multivibrator 23, also called the "identification oscillator", which preferably operates at a frequency between 10 KHz and 35 KHz.

The identification oscillator 23 is slaved to the blanking oscillator 21 in such a manner that the identification oscillator is turned off, or blanked, whenever the blanking oscillator is off. With respect to the multivibrators 21, 23, the term "off" as used herein means its low level output and the term "on" means its high level output. The output of the modulator 16 is, therefore, a square wave at the frequency of the identification oscillator 23 which is blanked whenever the blanking oscillator 21 is off.

The output signal from the modulator 16 controls the transistor switching circuit 14. When the output of the modulator is at its high level, the transistor switch 14 is turned on and a carrier frequency from the RF oscillator 12 is transmitted. When the output of the modulator 16 is at its low level, the transistor switch 14 is turned off and there is no transmission.

The transmitter 10 is powered by a voltage supply 18 which, in the preferred embodiment, is comprised of a battery 17 and a transmit and off timer circuit 19. In the preferred embodiment of the transmitter 10, the battery 17 provides power following a mechanical movement, such as the opening of a door or window, which closes the normally open warning switch 15. The purpose of the transmit and off timer circuit 19 is to deactivate the transmitter 10 after approximately 40 milliseconds and inhibit transmission for 30 seconds. An impulse generator may be used as an alternative for the voltage supply 18, as will be understood by one skilled in the art.

Referring, in particular, to FIG. 2, a schematic diagram of the transmitter 10 is shown. The RF generator 12 is a standard high frequency radio transmitter of the type commonly used in garage door openers. The modulator 16 is comprised of four NAND gates 20, 22, 24, and 26 within a single integrated circuit. The first two NAND gates 20 and 22 are interconnected with resistors $R_5$ and $R_6$ and capacitor $C_6$ to form the blanking oscillator 21 which, in the preferred embodiment, has an output frequency of approximately 200 Hz. The operation of the multivibrator circuit is fully described in *COS/MOS Digital Integrated Circuits*, RCA Solid State '74 Databook Series SSD 203B, Pages 407–409, RCA Corporation, 1973, which is incorporated herein by reference.

The remaining NAND gates 24, 26 are connected to form the identification oscillator 23, preferably operated at an identification frequency between 1 KHz and 35 KHz. The output signal of the identification oscillator 26 is blanked at 200 Hz by the blocking oscillator 21.

The values of resistors $R_3$ and $R_4$ and capacitor $C_5$ determine the operating frequency of the identification oscillator 25. The chart shown below provides typical values which may be used to obtain desired output frequencies for the identification oscillator 25:

| Freq (KHZ) | R3 (KΩ) | R4 (KΩ) | C5 (pF) |
|---|---|---|---|
| 10 | 200 | 470 | 200 |
| 15 | 150 | 330 | 200 |
| 20 | 100 | 220 | 200 |
| 25 | 147 | 330 | 100 |
| 30 | 121 | 330 | 100 |
| 35 | 100 | 220 | 100 |

The transmit and off timer circuit 19 is comprised of a diode, Crl, three resistors, R8, R9, and R10, and a capacitor Cl. Two of the resistors, R8 and R9, preferably have the values of 10 Kω and 27 Kω, respectively, in the preferred embodiment. The other resistor, R10, is much larger in value, 5.1 MΩ in the preferred embodiment. Capacitor CL, which in the preferred embodiment has a value of 4.7μF, is connected in parallel with resistor R7.

When the normally open warning switch 15 is closed, for example, by the opening of a protected door, the transmit and off circuit 19 is energized. Initially, capacitor Cl acts like a short circuit and resistors R8 and R9 operate as a voltage divider network to provide a high level voltage to one input terminal of NAND gate 20, thereby allowing the modulator 16 to operate. As capacitor Cl becomes charged, the voltage at the junction of resistors R8 and R9 decreases. After approximately 40 milliseconds, voltage at the junction of resistors R8 and R9 will decrease to below that required as a high level input by NAND gate 20, thereby turning off the modulator 16. After the switch 15 is returned to its open position, capacitor Cl discharges through resistor R10, and after approximately 3 seconds the modulator 16 will again be operational.

Referring to FIG. 1, the waveform of the modulator's output signal is shown. Switch 14, comprised of a resistor $R_2$ and a transistor $T_2$, which is normally biased in its cutoff state, has its input terminal connected to the output of the modulator 16. Positive output pulses from the modulator 16 saturate transistor $T_2$ turning on the RF oscillator, allowing its carrier frequency to be transmitted.

The output of the transmitter 10 is a series of RF carrier transmissions at a frequency in the range of from 200–400 MHz at a repetition rate and duration determined by the modulator 16. The number of bursts of RF transmissions which are grouped together is determined by the frequency of the identification oscillator 23 divided by twice the frequency of the blanking oscillator 21. In the preferred embodiment, the number of such bursts would be between 11 and 99. In the drawings, only four bursts are shown for the sake of clarity.

Receiver Operation

Figure 3:
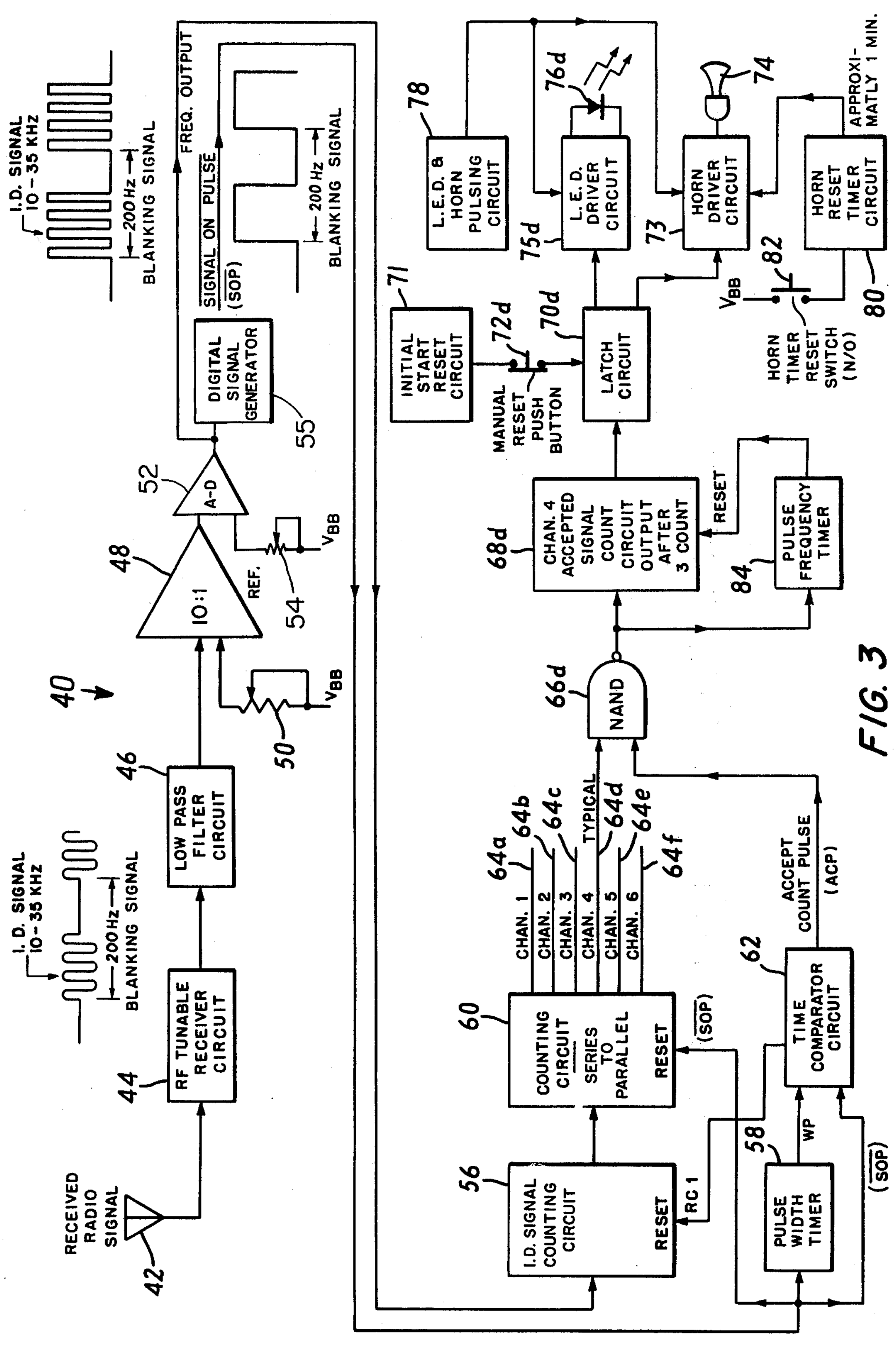
FIG. 3 is a block diagram of the receiver used in conjunction with the transmitter of FIGS. 1 and 2.

Referring generally to FIG. 3, the receiver 40 for the coded electronic security system monitors a single radio frequency in the range of from 200–400 MHz, and, in the preferred embodiment, can identify up to six independent transmitters. The receiver 40 picks up the transmitted RF signal at its antenna 42 and then amplifies, mixes, and detects the signal in an RF tunable receiver circuit 44, turned to the frequency of the transmitters.

The resulting signal is amplified and then filtered by an integrated circuit operational amplifier low pass filter 46, which passes only signals having a frequency below about 50 KHz. The filtered signal is amplified by another integrated circuit operational amplifier 48 having a control potentiometer 50 to adjust the output signal DC level so that only the transmitted signal is amplified. Normal background radio noise, already substantially reduced by the low pass filter 46, ends up in the positive saturation region of the amplifier 48 and is thereby eliminated. A third integrated circuit operational amplifier is used as a comparator 52 whose reference level is adjustable by another potentiometer 54. The output of the comparator 52 is a square wave signal corresponding to the output of the modulator 16 of the particular transmitter whose signal is being received.

The processed signal has the form of a series of pulses at the identification signal frequency followed by a period in which there is no signal, corresponding to the 200 Hz blanking frequency. The duty cycle of the blanking signal is approximately 50%. A digital monostable/astable multivibrator 55, shown in FIG. 5, connected in the monostable mode, changes state when triggered by a pulse and maintains the new state for as long as it is retriggered at a pulse rate higher than 10 KHz. The operation of the monostable/astable multivibrator is fully explained in *COS/MOS Digital Integrated Circuits*, supra, at pages 233–243. As long as the input pulse frequency remains higher than 10 KHz, the output of the monostable/astable multivibrator remains at a constant high level generating a signal which will be referred to as the inverted signal-on-pulse, or $\overline{SOP}$, which is slightly longer than the series of input pulses being counted.

In addition to being used to retrigger the monostable/astable multivibrator 55, the processed signal is applied to a pulse counting circuit 56.

The $\overline{SOP}$ starts a pulse width timer 58 which generates a window pulse, WP. At the same time, the $\overline{SOP}$ enables a channel counting circuit 60 and the WP signal enables the pulse counting circuit 56. The pulse width timer 58 is adjustable to allow it to accept variations of 200 Hz blanking due to transmitter component tolerances. The length of the $\overline{SOP}$ and WP signals are compared by a time comparator circuit 62. If the $\overline{SOP}$ is slightly longer than WP, an accept count pulse, ACP, signal is generated. Referring generally to FIG. 7, the relative timing of these pulses is shown.

The channel counting circuit 60 has a number of discrete output lines 64 corresponding to the number of identifiable transmitters in the system. In particular, for the preferred embodiment, the channel counting circuit 60 has six output lines called channels one through six and corresponding respectively to transmitters one through six. Counting circuit 60 has a single input, connected to the output of counting circuit 56, and receives a series of pulses identifying the channel corresponding to the received signal. The output of counting circuit 60 is a parallel representation of the received signal channel identification on lines 64*a* through 64*f*. Each channel output line 64 is connected to one input of a NAND gate 66 (only one of which, 66*d*, is shown in FIG. 3). The other input to each of the six NAND gates is connected to the output of the time comparator circuit 62 which compares the pulse widths of the $\overline{SOP}$ and WP signals.

The actual identification of the channel, correspondng to the particular transmitter being received, is done by the pulse counting circuit 56 which can accept from 1 to 99 pulses within the time alloted by the WP signal. For example, if the WP time is 2 milliseconds, there would be a count of 20 for an identification frequency of 10 KHz, 30 for an identification frequency of 15 KHz, 40 for an identification frequency of 20 KHz, 60 for an identification frequency of 30 KHz, and 70 for an identification frequency of 35 KHz. In order to allow for variations due to component tolerance in the transmitters, the channel limit of channel one is preferably set at 15, channel 2 at 25, channel 3 at 35, channel 4 at 45, channel 5 at 55, and channel 6 at 65. These limits are connected to a particular NAND gate 110 representing each channel. As the pulse counter 56 exceeds each channel limit, it sends a pulse to the channel counting circuit 60. For example, four pulses are sent to the channel counting circuit 60 during the tme the WP signal is on, to indicate channel four. The NAND gate 66*d* connected to the channel four output line 64*d* of the channel counting circuit 60 receives a second high input from the ACP signal and would send a pulse to a pulse counter 68*f* connected to its output.

The purpose of the pulse counters 68 (only one of which is shown in FIG. 3) is to verify that an appropriate signal is being received by the receiver 40. Accordingly, the pulse counters 68 must receive three correct signals in a row before the receiver 40 indicates receipt of a signal from an identifiable transmitter. After a pulse counter 68 has received its third correct pulse, a latch circuit 70, which can only be reset manually by opening a normally closed switch 72, is set. The latch circuit 70 is used to switch on an audio signal, such as a horn 74, to indicate that a transmitter has been activated, and a visual signal, such as an LED 76, to indicate which particular transmitter has signaled the receiver.

Various reset signsls are provided in the receiver 40 to prevent false alarms. The first reset condition occurs either if the monostable/astable multivibrator 55 is being retriggered by a pulse frequency of less than 10 KHz, such as a random noise pulse or if the $\overline{SOP}$ pulse width is shorter than the WP pulse width. In either case, the time comparator circuit 62 is prevented from generating an ACP signal. Instead a reset signal, RCl, is generated. The RCl signal resets the pulse counting circuit 56 and the $\overline{SOP}$ signal resets the channel counting circuit 60.

Similarly, if the time between $\overline{SOP}$ pulses is too long, the channel counting circuit 60 is reset to a zero count. Therefore, both the duration and the frequency of the $\overline{SOP}$ signal are checked as part of the signal verification process.

The final signal verification is made at the output of each of the NAND gates 66 connected to the channel output lines 64 of the channel counting circuit 60. There, a pulse counter 68 must verify the count rate before the latch circuit 70 is operated. A pulse frequency timer 84 resets all of the pulse counters 68 unless one of the pulse counters 67 has reached a count of three within a predetermined time period, after which all of the pulse counters 68 are reset.

In the preferred embodiment of the present invention, a light 76 and horn 74 pulse on together to indicate the receipt of an actuating transmission. The signalling devices are driven by appropriate driver circuits 73 and 75 respectively, which indicate the channel number of the actuating transmitter and attract attention.

The horn 74 can get turned off with a reset button 82 for approximately 1 minute. Thereafter, the horn 74 will recycle unless the manual reset button 72 has been reset. Resetting the push button 72 unlatches the latch circuit 70, thereby resetting the horn 74 and LED 76 until the next actuating signal is received.

Figures 4, 5:
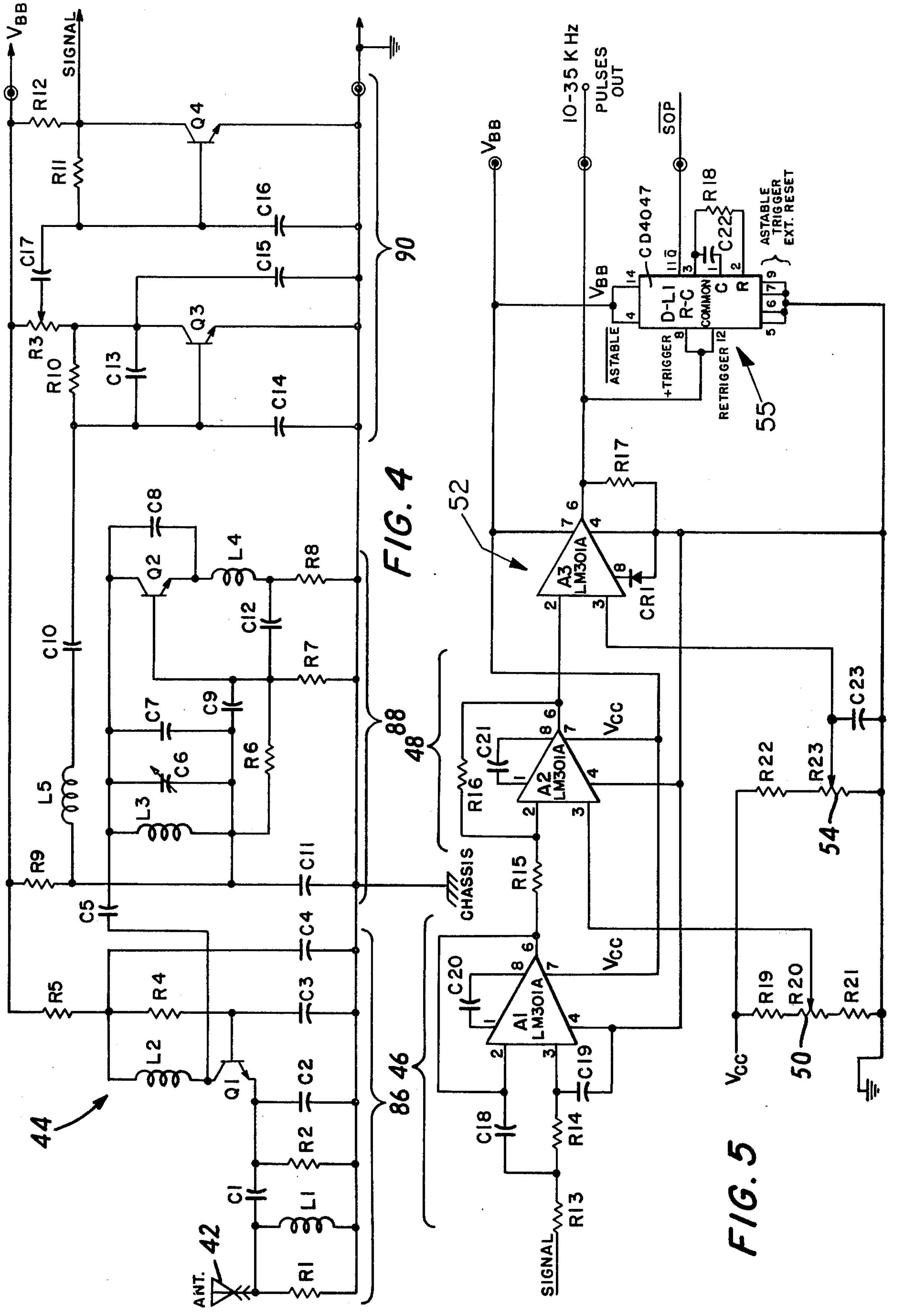
FIG. 4 is a schematic diagram of the radio frequency portion of the receiver of FIG. 3.
FIG. 5 is a schematic diagram of the analog-to-digital converter portion of the receiver of FIG. 3.

Referring now to FIG. 4, a schematic diagram of a conventional RF tunable receiver circuit 44, having an antenna 42, is shown. The receiver circuit 44 picks up the transmitted RF signal at its antenna 42, then amplifies it at an RF amplifier stage 86, mixes at a mixer stage 88, and finally detects the modulator's signal at a detector stage 90.

Referring generally to FIG. 5, the detected signal output from the receiver circuit 44 of FIG. 4 is filtered by an integrated circuit low pass filter 46 including an operational amplifier Al. The signal is then amplified by an amplifier stage 48 includng an operational amplifier A2 whose biasing circuit includes a control potentiometer 50.

The filtered, amplified signal is fed into the comparator and analog-to-digital converter circuit 52 which includes another operational amplifier A3 biased by potentiometer 54. The output of analogue to digital converter circuit 52 corresponds to the output signal of modulator 16 described in conjunction with the operation of transmitter 10. This signal is supplied as an input to digital signal generator 55, whose output corresponds to the blanking signal of the transmitter's blanking oscillator 21, and has been referred to as the SOP signal in conjunction with the description of the block diagram of receiver 40.

Figure 6B:
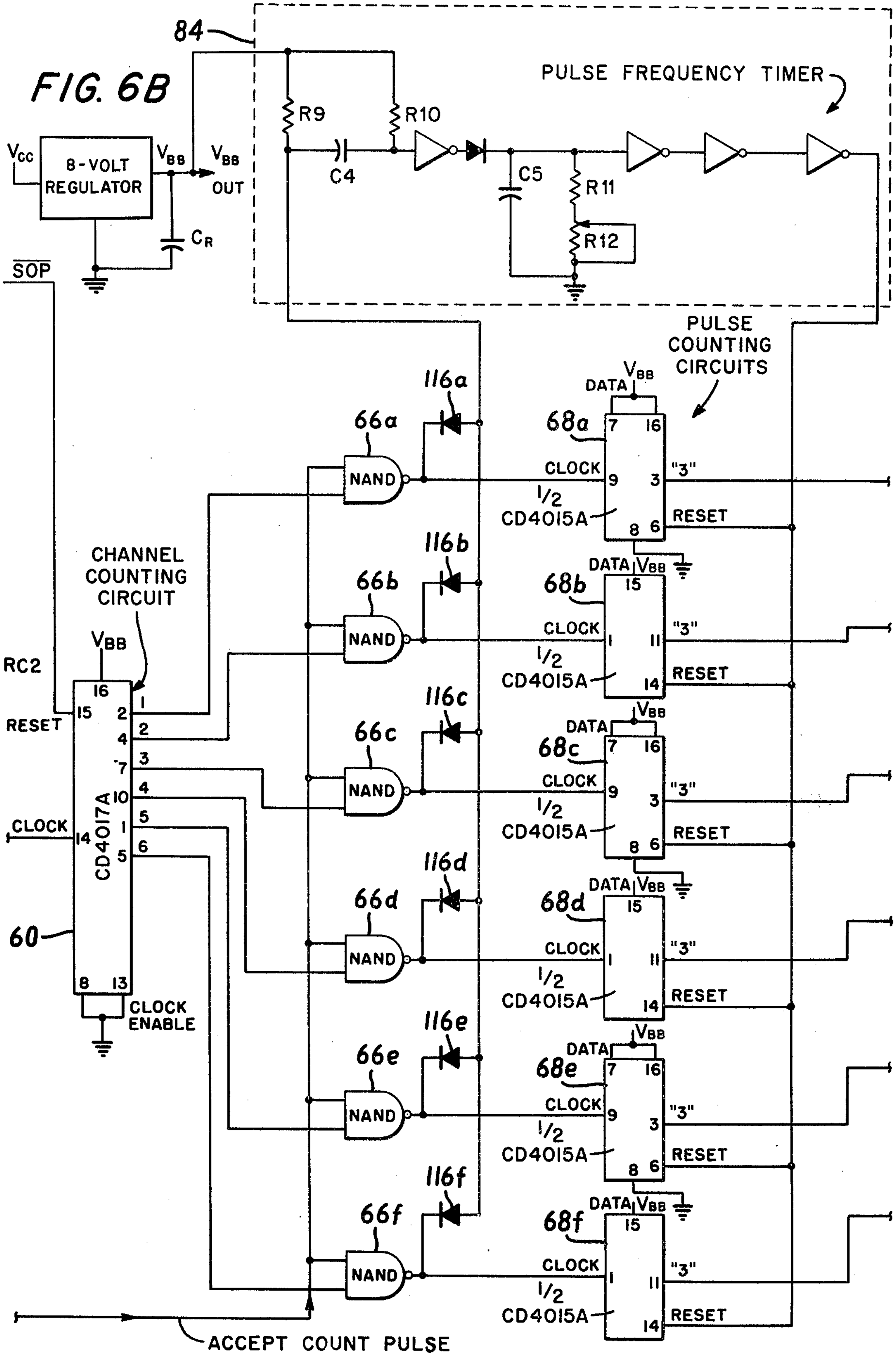
FIG. 6, comprised of FIGS. 6*a*, 6*b*, and 6*c*, is a schematic diagram of the decoding portion of the receiver.
Figure 6C:
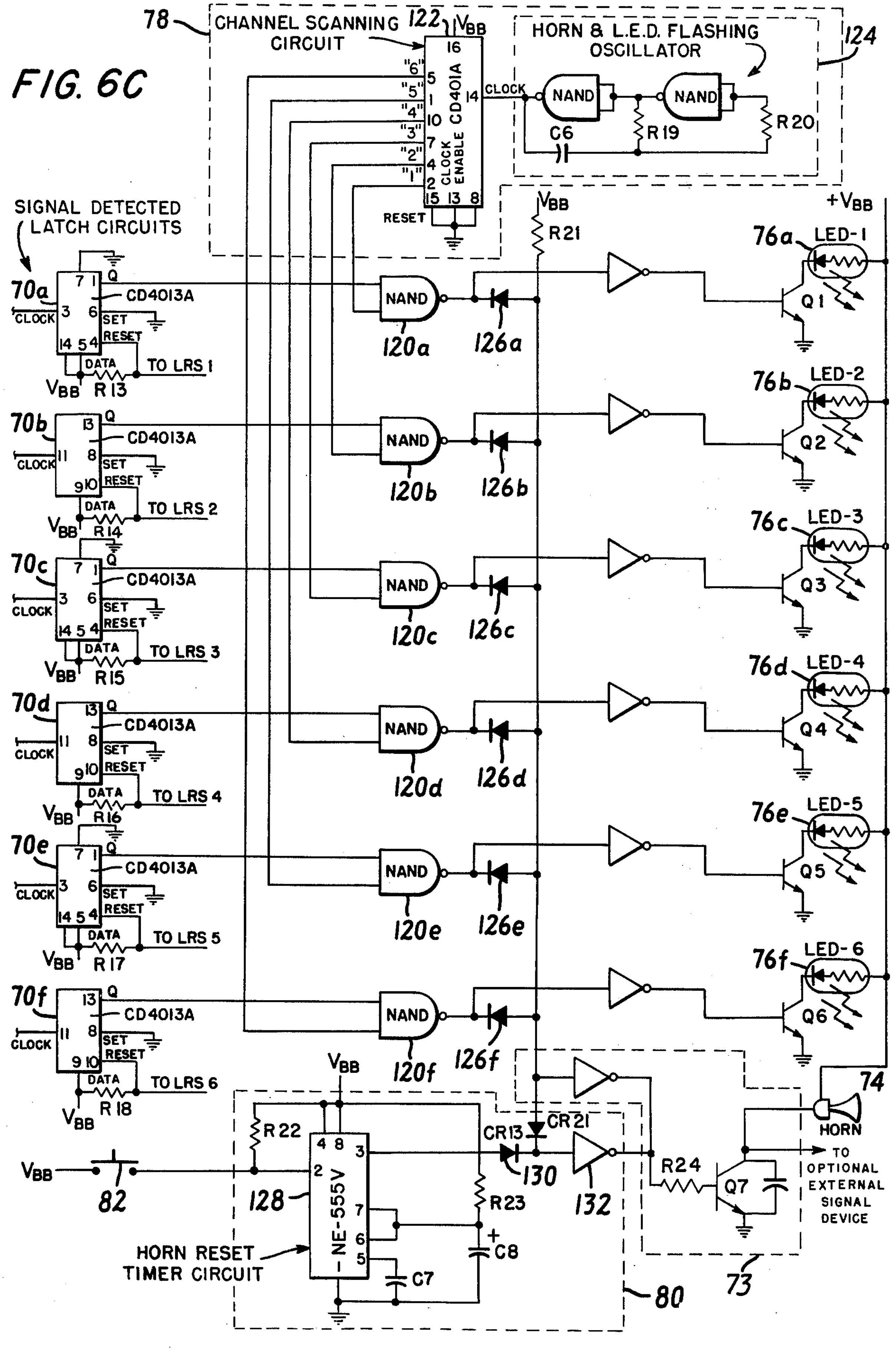

Referring generally to FIGS. 3 and 6, the SOP signal is fed into a pulse width timer circuit 58, comprised of inverters 92 and 94, capacitors C1 and C2, and resistors R2, R3, and R4. The pulse width timer 58 generates the window pulse, WP, previously referred to. The operation of the pulse width timer circuit 58 is described in *COS/MOS Digital Integrated Cicuits*, supra, at page 411.

Referring generally to FIGS. 6 and 7, the pulse width timer 58 is adjusted to provide a window pulse, WP having a slightly shorter duration than the $\overline{SOP}$. The output of inverter 98 is the SOP signal, which is then fed into one input of a NAND gate 100. The other input to the NAND gate 100 is the $\overline{WP}$ signal, which goes to its high level simultaneously with the SOP signal but has a slightly shorter duration. RC1, the output of NAND gate 100 will be at its low level whenever both SOP and $\overline{WP}$ are high. Accordingly, if SOP goes to its high level when $\overline{WP}$ does, and SOP stays high for a loner period of time then $\overline{WP}$, RC1 will correspond to WP.

SOP and RC1 are both fed into NAND gate 102 whose output is inverted by NAND gate 104. The output of NAND gate 104 is the accept counting pulse, ACP, signal. The combination of NAND gates 102 and 104 are the equivalent of a single AND gate. Accordngly, the ACP signal is at its high level whenever the RC1 and SOP signals are both at their high levels corresponding to the excess duration of the SOP high level beyond the $\overline{WP}$ high level.

Referring generally to FIGS. 3 and 6, the frequency output signal of comparator circuit 52 is fed into the pulse counting circuit 56 comprising a pair of decade counters 106, such as RCA Digital Integrated Circuit type CD4017A. The first decade counter 106 *a* is advanced one count at the positive input signal transition of each input pulse until it reaches the count of ten, at which time it generates a carry out signal which is sent to the input of decade counter **106*b*. The first decade counter 106*a*, therefore, advances in unit multiples and the second decade counter 106*b*, in multiples of ten. When the RC1 signal from the output of NAND gate 100 is high, the decade counters 106**, are reset to zero.

A series of NAND gates 110, each having the cathode of diodes 112 connected to their outputs make up a count sorting circuit. The purpose of the count sorting circuit is to recognize that the pulse counting circuit 56 has exceeded the predetermined channel limit related to each transmitter in the system. Accordingly, if the channel limits are set with the pulse count of channel 1 at 15, channel 2 at 25, channel 3 at 35, channel 4 at 45, channel 5 at 55, and channel 6 at 65, as discussed above, one input of each of the NAND gates 110, will be connected to the "5" output terminal of the first decade counter **106*a*. The other input terminal of each of the NAND gates 110 will be connected to the "10", "20", "30", "40", "50", "60" terminals, respectively, of the second decade counter 106*b***.

The output of each NAND gate 110 goes to its low level when its associated channel limit has been reached. The diodes 112 prevent the outputs of the other NAND gates, which remain at their high level, from affecting the voltage drop across resistor R8 each time a NAND gate goes to its low level. A NAND gate 114 is connected as an inverter to the output of the count sorting circuit. The output of NAND gate 114 is connected to the input of the channel counting circuit 60 comprised of a decade counter, preferably of the same as those used in the pulse counting circuit. The channel counting circuit 60, starting with an output of zero, is incremented by one each time a channel limit is reached. Thus, for example, a count of 25 pulses by the pulse counting circuit 56 would first casue NAND gate **110*a* to send a pulse to the channel counting circuit 60 first when a count of 15 is reached and then would cause a second pulse to be sent to the channel counting circuit 60 when a count of 25 is reached. The channel counting circuit would then indicate that channel 2** has been activated.

The decade counter of the channel counting circuit 60 is reset by the $\overline{SOP}$ signal, i.e. simultaneously with the resetting of the pulse counting circuit 56.

Following the time window determined by the pulse width timer 58, the pulse counting circuit 56 is reset to zero by the RC1 signal. At that time, the ACP signal is generated. The ACP signal and the output of the channel counting circuit 60 comprise the inputs to the NAND gates 66. The output of the NAND gate 66 associated with the activated channel is switched to its low level. The output of each of the NAND gates 66 is connected both to the cathode of one of a series of diodes 116 and to the clock input of one of a series of pulse counters or static shift registers 68, such as RCA Digital Integrated Circuit type CD4015A.

When the output of one of the NAND gates 66 is switched to its low level, there is a voltage drop across resistor R9 which starts the pulse frequency timer 84, the operation of which is more fully described in *COS/MOS Digital Integrated Circuits, supra, at page* 410. The output signal of the activated NAND gate 66 also advances the output of the static shift register 68 to which its output is connected. If the static shift register 68 reaches a count of three before the pulse frequency timer 84 generates a reset signal, a latch circuit 70, preferably a dual D-type flip-flop, such as RCA Digital Integrated Circuit type CD4013A, connected to the output of the static shift register 68 receives an input signal at its clock input. Unless three input pulses are received by the clock input of the static shift register 68 within the time allowed by the pulse frequency timer 84, all of the static shift registers 68 are reset and no signal will be forwarded to any of the latch circuits 70.

When one of the latch circuits 70 receives an input signal from its associated static shift register 68, the output signal of the latch 70 transitions from its normal low level to its high level, and there will be a corresponding high input to an associated NAND gate 120 connected to the output of the static shift register 68. The other input of each of the NAND gates 120 is attached to an output terminal of the LED and horn pulsing circuit 78 comprised of a decade counter, called the channel scanning circuit 122, driven by an astable multivibrator 124 of the type described with reference to the transmitter blanking oscillator 21. The frequency of the astable multivibrator 124 is preferably set a approximately 3 Hz.

The cathodes of a series of diodes 126 and the input terminals of a series of LED driver circuits 75 are each connected to the output terminals of respective ones of the NAND gates 120. The anodes of the diodes 126 are all connected together and to a horn driver circuit 73 which drives an audio alarm, preferably in the form of an electronic horn 74. Each of the LED driver circuits 75 drives an LED 76 associated with a particular one of the transmitters in the system. The LED's 76 used in the preferred embodiment are made by Dialight Corporation as Model No. 244-7870-3731-504. These LED's 76 include built-in current limiting resistors.

The astable multivibrator 124 cycles the channel scanning circuit 122 through each of its outputs. The outputs of the channel scanning circuit 122 serially interrogate each of the NAND gates 120, one of which is associated with each channel. When a signal is detected and verified for a channel, the associated latch circuit 70 holds one input of the associated NAND gate 120 at a high level. When that NAND gate 120 is interrogated by the pulsing cicuit 78, the LED 76 associated with that channel will flash and the horn 74 will sound.

A horn reset timer circuit 80 comprises an integrated circuit timer 128, preferably of Signetics type Ne-555V. The output of the integrated circuit timer 128 is connected to the anode of a diode 130 whose cathode is connected to the input of an inverter 132. When the output of the inverter 132 is at its low level, the horn drive circuit 73 is turned off silencing the horn 74. Each time the normally open horn timer reset switch 82 is depressed, timer 128 places a high level signal on the input of inverter 132 silencing the horn 74 for one and one-half minutes.

An initial start-reset circuit 71 is provided in the receiver to insure that each of the latch circuits 70 has a low level output when the system is first energized. The start-reset circuit 71 comprises a dual D-type flip-flop whose clock input is connected to an RC circuit comprising resistors R5 and R6 and capacitor C3. Each time the receiver is energized, a positive-going pulse is imposed upon the clock input to the flip-flop while the set, reset, and data inputs are kept at the low level. This insures that the output of the flip-flop, which is connected to each of the reset inputs of the latches 70, provides a reset signal to insure that the output of the latches 70 are low.

The start-reset circuit 71 is also used to reset a latch 70 which has been activated. Resetting the latch disables the associated NAND gate 120, thereby turning "off" both the LED 76 and the horn 70 associated with the channel.

I claim:

1. A receiver, usable in an electronic security system which includes at least one transmitter for selectively transmitting a pulse coded signal comprising a series of transmissions, repeated at a selected transmission repetition frequency, each transmission having a selected duration and comprising a plurality of pulses at a selected pulse repetition frequency, comprising:

a. means for receiving and demodulating said signal to obtain a first digital signal comprising digital pulses at said selected pulse repetition frequency;
b. a digital counter for counting the number of pulses in said first digital signal during a predetermined time interval and providing an output representative of the range of said pulse repetition frequency;
c. indicator means, responsive to said counter output, for indicating that a signal has been received which contains pulses having a pulse repe5tition frequency within a predetermined range;
d. a digital signal generator responsive to said first digital signal, for providng a scond digita signal, said digital signal generator providing a continuous output pulse as long as said first digital signal has a pulse repetition frequency which exceeds a fist selected frequemncy, said first selected frequency being lower than said pulse repetition frequency and higher than said transmission repetition frequency, whereby said second digital signal comprises pulses at said transmission repetition frequency and having said selected duration
e. first inhibiting means, responsive to said second digital signal, for inhibiting said indicating means if said pulse duration of said second digital signal is less than said predetermined time interval; and
f. second inhibiting means, responsive to said second digital signal and said counter output, for inhibiting said indicating means if the repetition frequency of said second digital signal or said counter output is less than a second selected frequency.

2. The receiver of claim 1 wherein said means for providing a second digital signal comprises a multivibrator which changes state and maintains its new state for as long as it is retriggered at a pulse repetition frequency higher than said first selected frequency, the trigger input to said multivibrator comprising said first digital signal and the output of said multivibrator comprising said second digital signal.

3. The receiver of claim 1 wherein said first inhibiting means comprises a multivibrator which generates a pulse having a duration equal to said predetermined time interval, said multivibrator being triggered by said second digital signal, and means for comparing the pulse width of said first digital signal with the pulse width of the pulse generated by said multivibrator.

4. The receiver of claim 1 wherein said means for counting comprises a digital integrated circuit decade counter.

5. The receiver of claim 1 wherein said second inhibiting means comprises a timer, a pulse counter, and a latch, said latch being set only if a predetermined number of pulses are counted by said pulse counter within a second timer.

6. The receiver of claim 1 wherein said means for indicating includes a light emitting diode for each transmitter in the system.

7. The receiver of claim 6 wherein said means for indicating further comprises means for flashing said light emitting diodes.

8. The receiver of claim 6 wherein said means for indicating further comprises a horn.

9. The receiver of claim 8 wherein said means for indicating further comprises means for pulsing said horn.

10. The receiver of claim 1 wherein said pulse coded signal is an RF signal in the range of 200 MHz to 400 MHz.

11. The receiver of claim 1 wherein said first digital signal is a square wave.

12. The receiver of claim 11 wherein the frequency of said first digital signal is in the range of 5 KHz to 50 KHz.

13. The receiver of claim 1 wherein said second digital signal is a square wave.

14. The receiver of claim 13 wherein the frequency of said second digital signal is in the range of 50 Hz to 500 Hz.

* * * * *

UNITED STATES PATENT AND TRADEMARK OFFICE

CERTIFICATE OF CORRECTION

PATENT NO. : 4,032,848

DATED : June 28, 1977

INVENTOR(S) : Frank J. Shaughnessy

It is certified that error appears in the above-identified patent and that said Letters Patent are hereby corrected as shown below:

Column 2, line 16, "system" should read --signal--;

Column 3, line 44, "1 KHz" should read --10 KHz--;

Column 3, line 65, "10 Kω and 27 Kω" should read --10 KΩ and 27 KΩ--;

Column 3, last line, "CL" should read --Cl--;

Column 4, line 17, "3 seconds" should read --30 seconds--;

Column 5, line 67, "tme" should read --time--;

Column 6, line 19, "signsls" should read --signals--;

Column 6, line 41, "67" should read --68--;

Column 6, line 51, "get" should read --be--;

Column 6, last line, "includng" should read --including--;

Column 7, line 12, "SOP" should read --$\overline{SOP}$--;

Column 7, line 15, "SOP" should read --$\overline{SOP}$--;

Column 7, line 34, "loner" should read --longer--;

Column 9, line 27, "Ne-" should read --NE- --;

Column 10, line 3, "repe5tition" should read --repetition--;

UNITED STATES PATENT AND TRADEMARK OFFICE

CERTIFICATE OF CORRECTION

PATENT NO. : 4,032,848

DATED : June 28, 1977

INVENTOR(S) : Frank J. Shaughnessy

It is certified that error appears in the above-identified patent and that said Letters Patent are hereby corrected as shown below:

Column 10, line 6, "scond digita" should read --second digital--;

Column 10, line 9, "fist" should read --first--;

Column 10, line 10, "frequemncy" should read --frequency--; and

Column 10, line 45, after "second" insert --time period determined by said--.

Signed and Sealed this

*Fifteenth* Day of *November 1977*

[SEAL]

*Attest:*

RUTH C. MASON
*Attesting Officer*

LUTRELLE F. PARKER
*Acting Commissioner of Patents and Trademarks*